Nov. 26, 1968     C. W. VERRELL ET AL     3,412,761

INSULATING BOOM AND METHOD OF MANUFACTURE

Original Filed Sept. 28, 1964     2 Sheets-Sheet 1

INVENTORS.
CURTIS W. VERRELL
ALAN T. VALENTINE
BY
Kramer & Sturges

ATTORNEYS

Nov. 26, 1968    C. W. VERRELL ET AL    3,412,761
INSULATING BOOM AND METHOD OF MANUFACTURE
Original Filed Sept. 28, 1964                    2 Sheets-Sheet 2

INVENTORS.
CURTIS W. VERRELL
ALAN T. VALENTINE
BY

ATTORNEYS.

United States Patent Office 3,412,761
Patented Nov. 26, 1968

3,412,761
INSULATING BOOM AND METHOD
OF MANUFACTURE
Curtis W. Verrell and Alan T. Valentine, Fairview Park,
Ohio, assignors to The Ohio Brass Company, Mansfield,
Ohio, a corporation of New Jersey
Application Sept. 28, 1964, Ser. No. 399,437, which is a
continuation-in-part of application Ser. No. 195,155,
May 16, 1962. Divided and this application June 9,
1966, Ser. No. 569,779
6 Claims. (Cl. 138—153)

ABSTRACT OF THE DISCLOSURE

This invention relates to an article of manufacture which is a composite boom structure formed from resin bonded glass fiber mat, resin impregnated woven glass fiber roving wound transversely to the axis of the boom and containing longitudinally disposed woven glass fiber tapes to increase the strength of the boom.

---

This application is a division of co-pending application Ser. No. 399,437, filed Sept. 28, 1964, which, in turn, is in part a continuation of application Ser. No. 195,155, filed May 16, 1962, now abandoned.

This invention relates to insulating booms and methods of manufacture.

The application concerns particularly booms and arms of the type which may be used in connection with Faraday cages and like apparatus for working high tension power lines while energized without requiring personnel to utilize insultating gloves or the like.

An object of the invention is to assure the safety personnel by providing booms which are sound and effective insulators when installed, but which also retain their insulating properties when exposed to rain, fog and inclement weather.

A further object of the invention is to provide booms which are light in weight, yet mechanically strong, which are durable, and which may be manufactured easily and at relatively small expense.

Other and further objects, features and advantages of the invention will become apparent as the description proceeds.

In carrying out the invention in accordance with a preferred form thereof, a metal mandrel of appropriate cross-sectional shape according to the desired cross-sectional shape of the boom is coated with layers of glass fiber material impregnated with resin. Preferably, this is accomplished by coating a mandrel of metal such as steel with a layer of glass fiber mat impregnated with resin, curing the mat layer, dipping woven glass roving in liquid resin, wrapping the dipped woven glass roving around the mat layer and curing the resin in the woven glass roving. Tapes of woven glass fiber roving are laid along the length of the mandrel between the successive turns of the woven roving of which the boom is formed. According to the invention, the tapes may be applied in various positions and in various lengths to strengthen the walls of the boom, or the successive tapes applied along any one side of the boom can be of varying widths to form a crowned surface.

A better understanding of the invention will be afforded by the following detailed description considered in conjunction with the accompanying drawing, in which.

Figure 1:
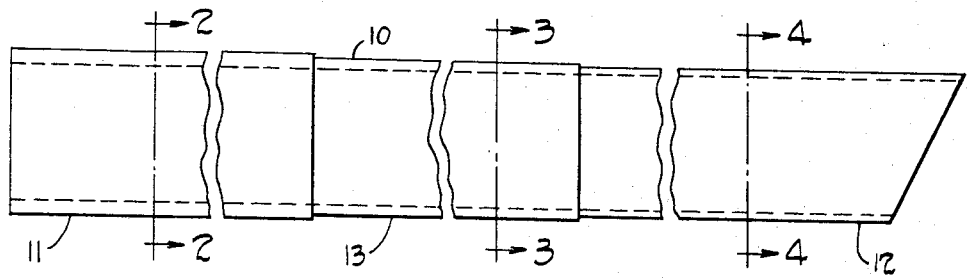
FIG. 1 is a fragmentary view with portions broken away of a hollow boom constructed in accordance with the invention.
Figures 2, 3, 4:
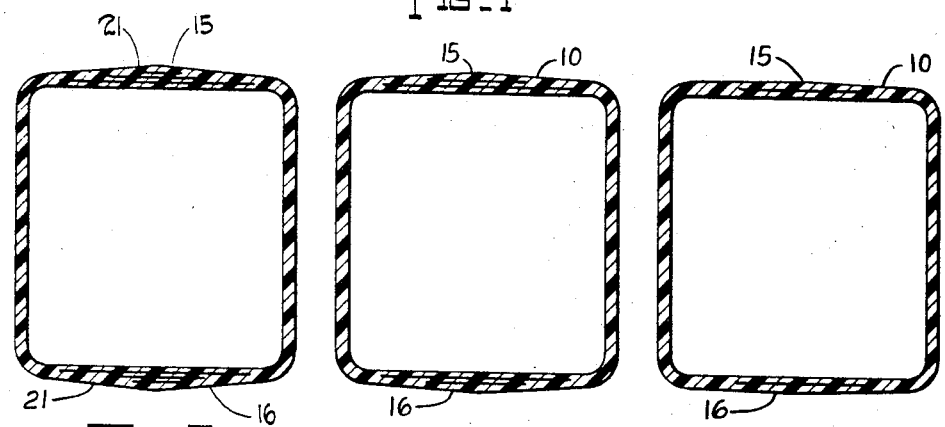
FIG. 2 is a view of a cross-section of the boom of FIG. 1 represented as cut by the plane 2—2 of FIG. 1.
Figure 5:
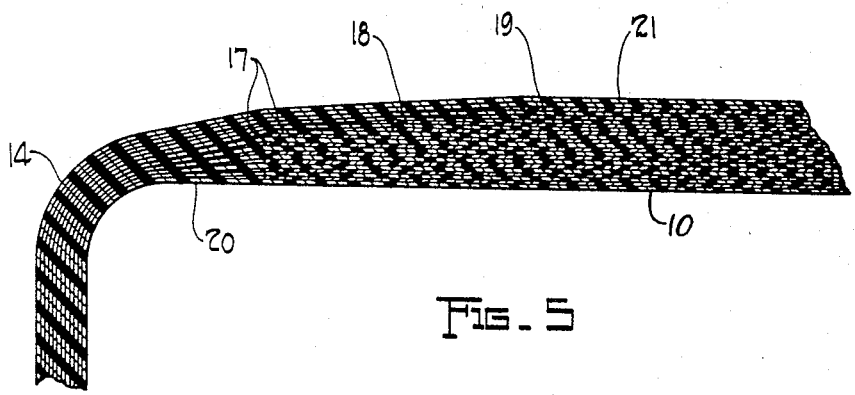
Figure 6:
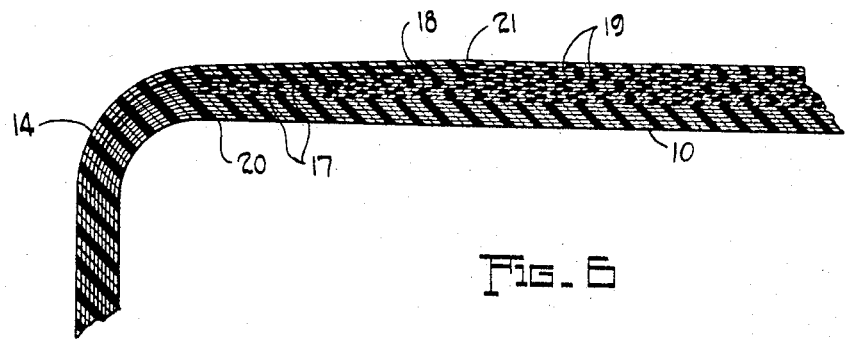
Figure 7:
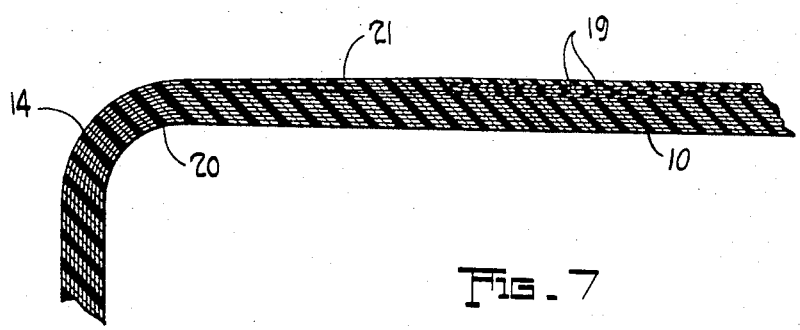
Figure 8:
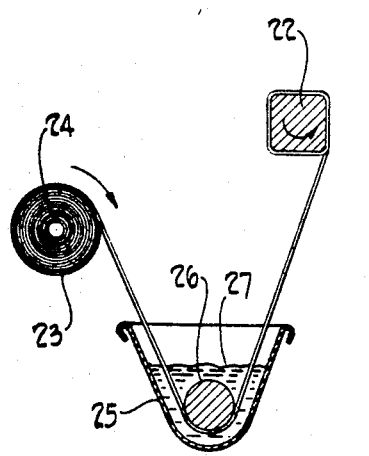
Figure 9:
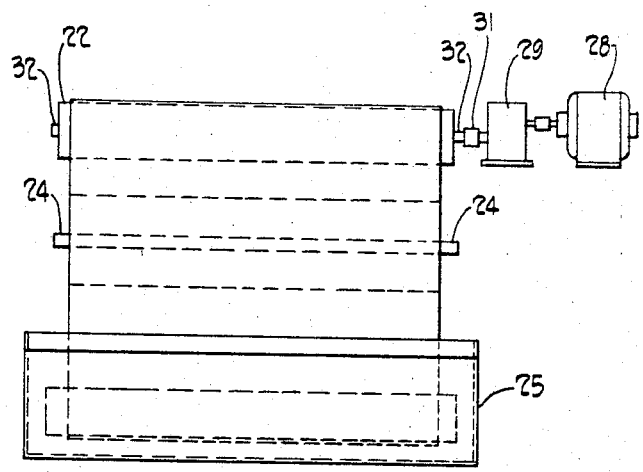

FIGS. 3 and 4 are views of other cross-sections of the boom of FIG. 1 represented as cut by the planes 3—3 and 4—4, respectively;

FIG. 5 is a fragmentary enlarged view in section of a portion of FIG. 1 to illustrate the construction in greater detail;

FIGS. 6 and 7 are views corresponding to FIG. 5 showing in greater detail portions of the corner of the section of FIGS. 3 and 4, respectively;

FIG. 8 is a diagram partially in section illustrating the method of forming the boom of FIG. 1 and illustrating mechanism employed therefor; and FIG. 9 is an elevation of the glass fiber winding apparatus and impregnating apparatus of FIG. 8.

Like reference characters are utilized throughout the drawing to designate like parts.

For the sake of lightness and strength the boom is in hollow form. Although circular, rectangular or other cross-sections may be employed, if desired, for the sake of illustration the invention has been illustrated in connection with a square cross-section boom. As illustrated in FIG. 2, the upper and lower sides of the boom are made thicker and with curving outer surfaces. This not only provides reinforced corners and increased tensile and compressive strength at these sides, but serves to drain moisture from the horizontal surfaces of the boom to prevent moisture accumulation and to insure that surface insulating properties of the boom are retained in rainy weather for insuring safety to personnel.

As indicated in FIG. 1, the boom 10 may be constructed with maximum wall thickness at one end 11, assumed to be the supported end, and minimum wall thickness at the oposite end 12, and intermediate portions such as the portion 13 of intermediate wall thickness.

As shown in FIGS. 5, 6 and 7, the boom 10 comprises a plurality of layers of insulating material 14, preferably a material of high degree of insulating properties which has no tendency to absorb moisture such as fiber glass fabric material. In order to increase the strength and form a unitary, integral whole, the glass fiber fabric is impregnated with a suitable plastic such as a polyester-styrene resin. Thickening of the upper and lower sides 15 and 16 is accomplished by interleaving tapes 17, 18 and 19 with the layers of glass fiber fabric material on the upper and lower sides.

Curving of the outer surface 21 of the upper and lower sides 15 and 16 is accomplished by making the tapes of different width. As shown, successive groups of tapes 17, 18 and 19 are made progressively narrower. The groups of tapes may also be made of different lengths.

In constructing the booms illustrated, preferably a steel mandrel 22 is employed. Where the boom is to have a square inner cross section, the mandrel 22 is also of square cross section. A smooth surface steel mandrel is preferably employed. Prior to applying the glass fiber fabric material, the mandrel may be waxed and polished. Then a parting or release agent, such as polyvinyl alcohol, may be applied to the surface. When this is done one coat is applied in liquid state with a soft cloth and dried. The wax employed in this procedure may be a carnauba wax.

The use of a separate parting agent may be obviated by an alternative procedure in which the steel mandrel is coated with a silicone grease. Such silicone grease not only serves to cause the mandrel to be released readily from the finished boom but also provides a water repellent interior surface to the hollow boom. This makes it unnecessary to employ any further step after the mechanical production of the boom has been completed such as coating or spraying or otherwise treating the interior surface of the boom to give it good electrical insulating properties so that the boom may be used safely in conjunction with work on very high tension electrical power lines.

The first layer of glass fiber material is preferably in the form of chopped strand mat in which the fiber strands are bonded together by a partially cured resin, so-called "B-stage" resin, in liquid form, which encapsulates the strands, such as is manufactured by Ferro Corporation. This resin is a modified silane, the simplest silicone hydride ($SiH_4$) with a suitable inert filler. One layer of 1½ ounce chopped strand mat 20 is wrapped around the steel mandrel 22, thus covering it and the strand mat is impregnated with an unpigmented resin, which prevents slippage when the woven roving is started. A suitable resin is a polyester-monomer mixture, for example, maleic anhydride/pentaerythritol polyester and either vinyl toluene or styrene, such as the polyester-monomer sold by the Interchemical Corporation as IC–1333 or IC–1333A. The resin employed is combined with a promoting or initiating agent such as a 2% solution of cobalt naphthenate or cobalt octoate and catalyzed with a suitable catalyst such as a 60% solution of methyl ethyl ketone peroxide. This layer is then allowed to cure and harden. The foregoing liquid resin is self-setting and not thermosetting. As a result of the exothermic chemical reaction produced by the presence of the promoting agent and catalyst, sufficient heat is generated to raise the temperature of the composition and cause curing to take place without necessity for an oven cure or a postcure.

Subsequent layers 14 of glass fiber material are in the form of woven glass fiber roving 23, preferably of the kind having a partially cured resin coating on the fibers. In order that the woven roving may readily be applied to the mandrel, the woven roving is first wound upon a storage tube 24, as illustrated in FIG. 8. The woven roving roll 23 is placed on support bearings (not shown) adjacent a trough shaped tank 25 arranged as a dip tank. Enough of the woven roving 23 is unwound to reach into the dip tank 25 and up to the mandrel 22. A steel bar 26 is placed on top of the woven roving to hold it in the bottom of the dip tank 25.

A pigmented plastic may be employed for impregnating the woven roving. If a yellow coloring is desired, a yellow paste pigment, such as that sold by the Ferro Corporation as V–900, is employed. The polyester-monomer resin, yellow pigment, cobalt naphthenate promoter or initiator and methyl ethyl ketone peroxide catalyst are thoroughly blended and poured into the dip tank 25 in sufficient quantity to bring the level 27 of the liquid resin mixture over the top of the bar 26. The saturated woven roving is then applied to one surface of the mandrel 22, to a flat side if the mandrel is other than round in shape. Preferably, however, until the last layer is reached, unpigmented, clear plastic is employed. This enables the winder to observe the presence of any air bubbles under a plastic-soaked layer of fabric and to press them out before winding on the next layer.

A fabric roller (not shown) is used to press the woven roving firmly in place and to squeeze out any air bubbles which may have formed. Thereafter, a grooved metal roller (not shown) is used to insure complete saturation of woven roving and to "work out" any entrapment of air between layers of woven roving and strands of glass. A suitable instrument such as a plastic paddle or a rubber squeegee (not shown) is then used as a squeegee to work out excess resin. If a rubber squeegee is used, it is similar to a winder washer's squeegee but composed of a suitable rubber compound which is not attached by the plastic or solvent employed in the process. Each layer is applied in this manner until the desired thickness of wall of the boom is achieved. It will be understood that for rotating the mandrel 22 as successive layers of woven glass roving are applied, a suitable drive is employed including, for example, a motor 28 with a reduction gear 29 connected by means of a disengageable coupling 31 to the shaft 32 carrying the mandrel 22.

Glass fiber finish material is then applied. For example, if desired, chopped strand "finish mat" may then be applied dry, in a spiral pattern as the mandrel revolves continuously at a slow speed. Thereafter, the finish mat may be rolled and squeegeed in the manner already described for the woven glass roving and followed by another layer of finish mat in a spiral pattern with the spirals intersecting the spirals of the layer below at approximately 90°, followed by rolling and squeegeeing. The entire boom or arm and the mandrel are then allowed to revolve until the arm has cured and hardened.

Alternatively, instead of the spiral layers, the two final layers of wrap may consist of two layers of fiber glass cloth of a width corresponding to the length of the wound portion of the mandrel, suitably rolled and squeegeed as previously described. A fiber glass cloth such as that sold by the Exeter Manufacturing Company may be employed.

Assuming that a clear unpigmented plastic has been employed in impregnating the previous layers, the final layer or the final two layers of glass cloth are pigmented by pouring on the pigmented resin.

When the boom has cured, the mandrel is removed from the drive unit 29–31 and placed in a withdrawal fixture (not shown). The mandrel 22 is then pulled out of the glass fiber boom. In the case of relatively small arms the glass fiber plastic arm may then be placed in a gas fired oven to postcure at approximately 130° F. for about two hours. However, it has been found that this is not necessary since by employment of suitable chemical composition in the plastic the exothermic chemical reaction produces enough elevation of temperature above room temperature for curing. Infrared radiation may also be employed, if desired, for curing arms which are too large to place in an oven for postcuring.

Following the open room chemical curing, or the furnace postcuring, if employed, the boom may then be "finished" by sanding smooth. Sanding, however, is unnecessary in order to obtain a smooth surface. A smooth surface may be obtained without sanding as a result of curing of the outer surface of the resin impregnated layer. The smooth surface is then coated with pigmented, promoted and catalyzed resin applied by brush. The boom is then ready to be fitted with such metal parts as may be required (not shown) and to be installed in the equipment in which it is to be used.

In order to provide additional strength to the tension and compression sides of the boom, the top and bottom sides 15 and 16, respectively, additional single layers of woven roving tapes such as the tapes 17, 18 and 19 are placed on the compression and tension sides, one at a time after each layer of woven roving has been completed. In the course of building up the boom the tapes also will become impregnated with resin. This impregnation may be accomplished by saturating the tapes with resin from the dip tank 25 and rolling and squeegeeing between layers of the continuous, wrapped-around woven roving material 23. Alternatively the tapes need not be themselves dipped in the dip tank but merely laid on the top side of the mandrel on the previously wound layer of fabric, which permits the tape to soak up resin from the layer of roving material below as well as the next layer of roving material when that layer is wound on. When the tape itself is not dipped into the dip tank, the roller used for rolling and squeegeeing before winding on the next layer of roving material is dipped into the dip tank.

Various arrangements of tapes may be utilized to produce desired structural characteristics in the boom. Thus, all of the tapes 17, 18 and 19 may be of the same width and extend the entire length of the boom in order to strengthen the top and bottom walls of the boom. Again, the tapes may be arranged in groups having the lengths of the sections 11, 11 and 13, and 11, 13 and 12, as illustrated schematically in FIGS. 2, 3 and 4. In this way, the lightest weight can be achieved for a desired strength of the boom inasmuch as the boom is supported along the section 11 and the load is applied to the outer extremity of the section 12. The rectangular hollow construction, especially when reinforced with the additional layers of tape, is structurally stronger from both a geometric and mechanical standpoint than circular cross-section booms because there is more material in a rectangular cross section than in a round tube of the same size. This makes the structural members so formed stronger especially in tension and flexure, which are both important in structural members such as booms.

FIG. 5 illustrates an arrangement of the tapes particularly useful in booms intended for use in energized line working. As there shown, the tapes vary in width with the widest tape close to the steel mandrel and having a transverse dimension only slightly less than the full width of the boom, and the narrowest tape close to the outer surface of the boom. This arrangement provides a convex contour or crown on the outer surface of the boom and serves to promote drainage of water and other foreign substances off the sides of the arm. This prevents water from draining down the full length of the arm and providing a path for current which could result in a short circuit or ground endangering the life of a man in the bucket of a Faraday cage or endangering other personnel on the ground.

In the alternative procedure, described at pages 4 and 5, in which silicone grease is applied to the steel mandrel to perform the function of a parting agent, it has been found that the silicone material is embodied in the hardened resin of the first layer of glass fiber material on the interior of the boom. Thus, the silicone material is dispersed through the polyester resin body of the first layer of glass fiber material along the interior of the boom, as well as being dispersed over the interior surface of the boom. The silicone grease, above referred to, is one form of silicone material useful for this purpose and may comprise a commercially available silicone grease, such as that sold by the General Electric Company under the designation of X4005 or XS4006. The presence of the silicone material minimizes tracking effects which would otherwise result from the application of high voltages, and particularly prevents the formation of conductive films of water due to the deposition of water vapor, fog, etc., on the interior of the boom.

For further assuring the maintenance of an insulating surface, a layer of silicone grease, such as that sold by the General Electric Company under the designation XS4006 or X4005, is applied to the outer surface of the boom. As previously explained, the inner surface of the hollow boom is already coated with silicone grease as a result of the greasing of the mandrel with silicone grease before the winding is commenced. However, satisfactory results have also been obtained where silicone grease had not been applied to the mandrel by applying a liquid solution to the inner surface to maintain its insulating properties. For example, a liquid which can be used is a silicone oil solution composed of one part No. F–145 silicone oil and one part xylene, as sold by the Dow Corning Company. The silicone coating provides further insulation and avoids contamination of the boom which could cause a short circuit or ground.

If desired, the curving outer surface of the top and bottom sides of the boom may be achieved by the utilization of a mandrel of special shape with the desired surface curvature in the top and bottom surfaces of the metal mandrel. In this manner a curved cross-section of the top and bottom surfaces of the boom would be provided both inside and outside. It would be unnecessary to provide splices or interleaved tapes of different widths in order to achieve the curvature of the surface and only tapes of the maximum width would be required. The full width tapes would give a stronger laminate and avoid the necessity for stocking several different widths of woven roving.

Certain embodiments of the invention and certain methods of operation embraced therein have been shown and particularly described for the purpose of explaining the principle of operation of the invention and showing its application, but it will be obvious to those skilled in the art that many modifications and variations are possible, and it is intended therefore, to cover all such modifications and variations as fall within the scope of the invention.

What is claimed is:

1. A non-conducting boom constituted as a hollow tubular structural member, comprising an inner layer of glass fiber mat, a continuous length of woven roving of glass fiber extending transversely about the longitudinal axis of the member in a plurality of successively overlapping layers, and tapes of woven roving disposed longitudinally between successive layers of the said layers of woven roving, and cured resin extending throughout the mat, roving, and tapes, and the said tapes comprising a structural reinforcing means for the said boom.

2. A boom in accordance with claim 1, with tapes of progressively decreasing width between successively outward layers to form a generally curved outer surface.

3. A boom in accordance with claim 1, with the tapes in different layers having progressively decreasing length between successively outward layers.

4. A boom in accordance with claim 1, with an adherent coating of resin on the fibers of the glass mat and silicone material dispersed in the inner layer along the interior of the member and coating the interior surface thereof.

5. An insulating member in accordance with claim 4, in which the silicone material in the resin of the body is formed from a layer of silicone material applied as a parting agent on the surface of a mandrel on which the member is formed during manufacture thereof.

6. An article of manufacture as in claim 1 wherein the glass fiber mat is composed of chopped strand.

References Cited
UNITED STATES PATENTS

| | | | |
|---|---|---|---|
| 1,400,078 | 12/1921 | Kempton | 138—141 |
| 2,525,272 | 10/1950 | Rhoton. | |
| 2,594,838 | 4/1952 | Alexander et al. | 138—156 X |
| 2,742,931 | 4/1956 | Ganall | 138—144 |
| 2,929,409 | 3/1960 | Waehner | 138—141 |
| 2,674,297 | 4/1954 | Greenwald | 138 |
| 2,943,009 | 6/1960 | Mirsky et al. | 138 |
| 3,212,664 | 10/1965 | Wagle | 156—191 XR |

LAVERNE D. GEIGER, *Primary Examiner.*

B. KILE, *Assistant Examiner.*